US 8,034,148 B2

(12) United States Patent
Tyler

(10) Patent No.: US 8,034,148 B2
(45) Date of Patent: Oct. 11, 2011

(54) METHODS AND COMPOSITIONS FOR SOIL AMENDMENTS AND ORGANIC WASTE MANAGEMENT

(75) Inventor: W. L. Skip Tyler, Bakersfield, CA (US)

(73) Assignee: Heart of Nature, LLC, Bakersfield, CA (US)

( * ) Notice: Subject to any disclaimer, the term of this patent is extended or adjusted under 35 U.S.C. 154(b) by 382 days.

(21) Appl. No.: 12/415,441

(22) Filed: Mar. 31, 2009

(65) Prior Publication Data
US 2010/0024500 A1 Feb. 4, 2010

Related U.S. Application Data

(60) Provisional application No. 61/084,568, filed on Jul. 29, 2008.

(51) Int. Cl.
*C05F 11/08* (2006.01)
(52) U.S. Cl. .......................... 71/8; 71/9; 71/10
(58) Field of Classification Search .............. 71/8, 9, 71/10
See application file for complete search history.

(56) References Cited

U.S. PATENT DOCUMENTS

| 1,490,774 | A | * | 4/1924 | Harnist | 71/25 |
| 2,313,434 | A | * | 3/1943 | Grether | 71/10 |
| 2,317,990 | A | * | 5/1943 | Grether | 504/117 |
| 2,317,991 | A | * | 5/1943 | Grether | 504/117 |
| 2,317,992 | A | * | 5/1943 | Grether | 504/117 |
| 4,503,154 | A | * | 3/1985 | Paton | 435/167 |
| 5,603,744 | A | * | 2/1997 | Kurner | 71/9 |

OTHER PUBLICATIONS

Haug, Roger T., The Practical Handbook of Compost Engineering, CRC Press, 1993.

* cited by examiner

*Primary Examiner* — Wayne Langel
(74) *Attorney, Agent, or Firm* — Knobbe Martens Olson & Bear LLP

(57) ABSTRACT

The present invention relates to agriculture and waste management. In particular, compositions and methods relating to soil amendments and organic waste management are provided. In certain aspects, soil amendments, and methods of making soil amendments, and methods for improving crop yields are provided.

23 Claims, No Drawings

US 8,034,148 B2

METHODS AND COMPOSITIONS FOR SOIL AMENDMENTS AND ORGANIC WASTE MANAGEMENT

CROSS-REFERENCE TO RELATED APPLICATIONS

This application claims the benefit of priority to U.S. provisional application 61/084,568 entitled "Manure and/or Biosolid Treatment" filed on Jul. 29, 2008, which is hereby expressly incorporated by reference in its entirety.

FIELD OF THE INVENTION

The present invention relates to agriculture and waste management. In particular, compositions and methods relating to soil amendments and organic waste management are provided.

BACKGROUND

Composting is the purposeful biodegradation of organic matter, such as yard and food waste. The decomposition is performed by micro-organisms, mostly bacteria, but also yeast and fungi. There are a wide range of organisms in the decomposer community. Composting organisms require Carbon ("C" or carbohydrates), to provide energy; Nitrogen ("N" or protein), to grow and reproduce more organisms to oxidize the carbon; Oxygen, for oxidizing the carbon, the decomposition process; and water, in the right amounts to maintain activity without causing anaerobic conditions. Certain ratios of these components provide beneficial bacteria with the nutrients to work at a rate that will heat up the compost pile.

During the conventional composting process, considerable water is released as vapor ("steam"), and the oxygen is quickly depleted. The hotter the pile gets, the more often added air and water is necessary. The air/water balance is essential to maintain the high temperatures required to break down the manure and green waste, typically found in a composting mixture. At the same time, too much air or water also slows the process, as does too much C (or too little N). If the pile is built in a short period, and has a good mix of materials (C:N) and a coarse structure, with about 50% moisture, the temperature should rise within days to as high as 60° C. (140° F.). As the temperature of the pile falls, more air is added by turning the pile or using an agitating tool. Typically, moisture is added at the same time. Turning or other aeration is usually needed about every 6-10 days to maintain the highest heat levels until the material is fairly uniformly broken down, and temperatures no longer rebound. A pile that has been maintained at peak temperatures may be ready for maturing in as little as 30-60 days but, generally, 75 days are required to obtain usable compost. The resultant organic compost typically has about 7 lbs of available nitrogen/cubic yard.

Traditional methods of composting, produce large volumes of harmful greenhouse gases including Ammonia, Methane, and Carbon Dioxide. The production of these gases not only generates noxious odors but the release of these gases drastically decreases the amount of available nitrogen and carbon in the composted end-product. Traditional composting is a smelly, slow process requiring a minimum of 30 days under optimal conditions, considerable heat, and frequent turning or aeration of the compost heap. The resulting amendment has lost a considerable amount of its nitrogen and carbon potential through out-gassing. Accordingly, there is a need for improved soil amendments and methods of composting.

SUMMARY

It has been discovered that by blending a particular mineral complex with manure and/or green waste or sewage, the time of the composting process can be significantly accelerated and the production of noxious gases (e.g., ammonia, methane, and carbon dioxide) can be drastically reduced. By this process, an improved compost or soil amendment having greater amounts of carbon and nitrogen (e.g., about 25 lbs nitrogen/cubic yard) is obtained.

Accordingly, several embodiments described herein concern soil amendments or compost that comprise, consist essentially of or consist of a blend of organic waste (e.g., manure and/or green waste and/or an ammonia-containing organic matter) and a mineral complex, wherein the mineral complex contains about 3-35% elemental Sulfur, about 5%-90% Thiosulfate, about 8%-70% Sulfate, about 5%-35% Calcium Sulfate, about 3%-10% soluble Calcium, about 8%-15% Potassium Sulfate, Aluminum Potassium Sulfate, and Potassium Silicate, Zinc, Iron, Iron Sulfate, Manganese, Copper, Boron, Molybdenum, and Nickel. Preferably, the mineral complex comprises, consists of, or consists essentially of about 8% Sulfate, about 7% Sulfur Trioxide, about 16% elemental Sulfur, about 9% Potash, about 2% Bisulfites, and about 3.4% Thiosulfites. Desirably, the mineral complex added to the soil amendment has a screen size that is less than, greater than, equal to or any number in between about 100, 200, 300, or 400 screen size.

In some embodiments, the organic waste portion of the amendment comprises manure. In some such embodiments, the manure includes cow manure, pig manure, chicken manure, turkey manure, rabbit manure, duck manure, sheep manure, goat manure, horse manure, or human manure. In more embodiments, the organic waste also comprises, consists of, or consists essentially of green waste, municipal solid waste, sewage, or an ammonia-containing organic matter. In some such embodiments, the organic waste portion of the amendment comprises, consists of, or consists essentially of a first component containing a manure and a second component containing green waste, municipal solid waste, sewage, or an ammonia-containing organic matter and the first and second components are present in a ratio of less than, greater than, equal to or any number in between about a 1:1, 1:2, 1:3, 1:4, or 1:5 first component:second component. That is, in some embodiments, the organic waste portion of the soil amendment comprises a mixture of manure and green waste, municipal solid waste, sewage, or an ammonia-containing organic matter that is less than, greater than, equal to or any number in between 10%, 15%, 20%, 25%, 30%, 35%, 40%, 45%, 50%, 55%, 60%, 65%, 70%, 75%, 80%, 85%, 95%, or 100% manure of the organic waste component. In some embodiments, the soil amendments described herein also contain *Thiobacillus* and the *Thiobacillus* can be a normal flora found in the mineral complex and/or the *Thiobacillus* can be exogenously added. In some embodiments, the composted mixture of organic waste and mineral complex or soil amendment has a pH of less than, greater than, equal to or any number in between about 7, 6, 5, 4, or 3.

In some embodiments, the ratio of mineral complex to organic waste in the soil amendment is less than, greater than, equal to or any number in between about 2, 4, 6, 8, 10, or 12 tons per 24 ton portion of said soil amendment. That is, in some embodiments, the ratio of mineral complex to organic waste in the soil amendment is less than, greater than, equal to or any number in between about a 1:1, 1:2, 1:3, 1:4, or 1:5 mineral complex:organic waste. Stated differently, the amount of mineral complex present in a soil amendment or compost described herein can be less than, greater than, equal to or any number in between 10%, 15%, 20%, 25%, 30%, 35%, 40%, 45%, 50%, 55%, 60%, 65%, 70%, 75%, 80%, 85%, or 95% of the soil amendment or compost. In some embodiments, the amount of available nitrogen in the soil amendment is less than, greater than, equal to or any number in between about 7, 8, 9, 10, 11, 12, 13, 14, 15, 16, 17, 18, 19, 20, 21, 22, 23, 24, 25, 26, 27, 28, 29, or 30 lbs available nitrogen/cubic yard.

Several embodiments also include methods of composting and methods of making soil amendments. Some such methods are practiced by providing a mineral complex, comprising, consisting essentially of, or consisting of about 3-35% elemental Sulfur, about 5%-90% Thiosulfate, about 8%-70% Sulfate, about 5%-35% Calcium Sulfate, about 3%-10% soluble Calcium, about 8%-15% Potassium Sulfate, Aluminum Potassium Sulfate, and Potassium Silicate, Zinc, Iron, Iron Sulfate, Manganese, Copper, Boron, Molybdenum and Nickel; providing organic waste; mixing the organic waste with the mineral complex; and composting the mixture of organic waste and mineral complex for a period of time comprising less than, greater than, equal to or any number in between about 10 days.

Preferably, the mineral complex used in these methods comprises, consists of, or consists essentially of about 8% Sulfate, about 7% Sulfur Trioxide, about 16% elemental Sulfur, about 9% Potash, about 2% Bisulfites, and about 3.4% Thiosulfites. Desirably, the mineral complex is added to the soil amendment in a screen size that is less than, greater than, equal to or any number in between about 100, 200, 300, or 400 screen size. Preferably the organic waste used in these methods comprises manure. The manure can comprise cow manure, pig manure, chicken manure, turkey manure, rabbit manure, duck manure, sheep manure, goat manure, horse manure, or human manure. In some methods the organic waste that is utilized comprises green waste, municipal solid waste, or sewage in lieu of or in addition to the manure. In some such embodiments, the organic waste portion of the soil amendment utilized in the composting method comprises, consists of, or consists essentially of a first component comprising a manure and a second component comprising a green waste, municipal solid waste or sewage and the first and second components are present in a ratio of less than, greater than, equal to or any number in between about a 1:1, 1:2, 1:3, 1:4, or 1:5 first component:second component. In some methods for making the soil amendments, the mineral complex is mixed at a rate of about 2, 4, 6, 8, or 12 tons per 24 ton portion of the soil amendment. That is, in some embodiments, mineral complex is mixed with the organic waste at a ratio that is less than, greater than, equal to or any number in between about a 1:1, 1:2, 1:3, 1:4, or 1:5 mineral complex:organic waste.

In some embodiments, the mixture is composted less than, greater than, equal to or any number in between about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days. In some methods of composting and methods of making soil amendments, the mixture of organic waste and mineral complex is blended or mixed in a ratio that produces a mixture having a pH of less than, greater than, equal to or any number in between about 7, 6, 5, 4, or 3.

More embodiments concern methods for reducing the odor of an animal pen or storage facility. Some such methods include providing a mineral complex comprising about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium Sulfate, Aluminum Potassium Sulfate, and Potassium Silicate, Zinc, Iron, Iron Sulfate, Manganese, Copper, Boron, Molybdenum, and Nickel; and contacting the ground of said animal pen or storage facility with an effective amount of the mineral complex for a period of time sufficient to reduce the odor. Preferably, the mineral complex used in these methods comprises, consists of, or consists essentially of about 8% Sulfate, about 7% Sulfur Trioxide, about 16% elemental Sulfur, about 9% Potash, about 2% Bisulfites, and about 3.4% Thiosulfites. Desirably, the mineral complex added to the soil amendment has a screen size that is less than, greater than, equal to or any number in between about 100, 200, 300, or 400 screen size. Preferably the mineral complex is applied to said animal pen or storage facility by powder applicator, spinner, drop applicator, spreader, duster, or sprayer.

In other embodiments, the mineral complex is applied to an effluent lagoon (e.g., manure pond or waste water treatment facility) so as to reduce the stench associated therewith and/or improve the processing of the manure. Accordingly, some such methods include providing a mineral complex comprising about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium Sulfate, Aluminum Potassium Sulfate, and Potassium Silicate, Zinc, Iron, Iron Sulfate, Manganese, Copper, Boron, Molybdenum, and Nickel; and contacting the effluent lagoon with an effective amount of the mineral complex for a period of time sufficient to reduce the odor or otherwise facilitate the processing of the manure. Preferably, the mineral complex used in these methods comprises, consists of, or consists essentially of about 8% Sulfate, about 7% Sulfur Trioxide, about 16% elemental Sulfur, about 9% Potash, about 2% Bisulfites, and about 3.4% Thiosulfites. Preferably the mineral complex is applied to said effluent lagoon by use of an aerator, auger, or rotating vessel.

More embodiments include methods for reducing the presence of algae in a water source. Some such methods include selecting a water source for a reduction in the presence of algae; providing a mineral complex that comprises about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium Sulfate, Aluminum Potassium Sulfate, and Potassium Silicate, Zinc, Iron, Iron Sulfate, Manganese, Copper, Boron, Molybdenum, and Nickel; contacting the water source with an effective amount of said mineral complex for a period of time sufficient to inhibit the algae growth; and detecting a reduction in the presence of algae in the water source. Preferably, the mineral complex used in these methods comprises, consists of, or consists essentially of about 8% Sulfate, about 7% Sulfur Trioxide, about 16% elemental Sulfur, about 9% Potash, about 2% Bisulfites, and about 3.4% Thiosulfites. Preferably the mineral complex is applied to said effluent lagoon by use of an aerator, auger, or rotating vessel.

Some embodiments include methods of inhibiting growth of a pathogenic microbe in soil. Some such methods can include providing a mineral complex that comprises about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium sulfate, Aluminum Potassium Sulfate, and Potassium Silicate, Zinc, Iron, Iron Sulfate, Manganese, Copper, Boron, Molybdenum, and Nickel; contacting the soil with an effective amount of said mineral complex for a period of time sufficient to inhibit the growth of the microbe; and measuring the amount of the microbe in the soil. In some such methods the pathogenic microbe can include coliform bacteria, *Escherichia coli, Salmonella* spp., *Salmonella enterai, Salmonella typhimurium, Shigella* spp., *Shigella dysenteriae, Shigella sonnei, Shigella flexneri, Bacillus pasteuri, Bacillus anthracis, Vibrio cholerae, Brucella abortus, Brucella suis, Brucella melitensis, Mycobacterium tuberculosis, Leptospira interohaemorrhagiae, Leptospira canicola, Leptospira Pomona, Yersinia enterocolitica*, and *Campylobacter jejuni*. Preferably, the mineral complex used in these methods comprises, consists of, or consists essentially of about 8% Sulfate, about 7% Sulfur Trioxide, about 16% elemental Sulfur, about 9% Potash, about 2% Bisulfites, and about 3.4% Thiosulfites. Preferably the mineral complex is applied to said soil by powder applicator, spinner, drop applicator, spreader, duster, or sprayer.

Some embodiments include methods for improving crop yield. Some such methods can include selecting a field for application of a soil amendment, providing a soil amendment or compost prepared as described above to said field; and measuring an increase in crop yield.

DETAILED DESCRIPTION

It has been discovered that the time of the composting process can be significantly accelerated and the production of noxious gases (e.g., ammonia, methane, and carbon dioxide) can be drastically reduced by blending a particular mineral complex with manure and/or green waste or sewage. Improved compost or soil amendments having greater amounts of carbon and/or nitrogen (e.g., less than, greater than, equal to or any number in between about 7, 8, 9, 10, 11, 12, 13, 14, 15, 16, 17, 18, 19, 20, 21, 22, 23, 24, 25, 26, 27, 28, 29, or 30 lbs available nitrogen/cubic yard) than conventional organic compost or soil amendments can be made by mixing the mineral complex provided herein with manure and/or green waste and composting the mixture for at least 10 days (e.g., less than, greater than, equal to or any number in between about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 days). The resultant compost promotes improved crop yield, as well as, better vegetable and fruit firmness and taste. The following section provides greater detail on the soil amendments described herein.

Soil Amendments

Generally, the soil amendments provided herein can include a mineral complex blended with an organic waste. In preferred embodiments, the soil amendment can be in a composted form. As used herein, "composted" and grammatical equivalents thereof, can refer to a substrate that has undergone a composting process. A composting process can include the biological decomposition of organic matter to produce a product that can be beneficially applied to land. Typically, decomposition occurs under conditions that allow the development of thermophillic temperatures as a result of biologically produced heat. However, in some embodiments, decomposition may be further expedited through additional chemical induced processes.

With respect to mineral complexes, in certain embodiments, mineral complexes can include about 3%, 4%, 5%, 6%, 7%, 8, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% elemental Sulfur, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, and 90% Thiosulfate, about 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, and 70% Sulfate, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% Calcium Sulfate, about 3%, 4%, 5%, 6%, 7%, 8%, 9%, and 10% soluble Calcium, about 8%, 9%, 10%, 11%, 12%, 13%, 14%, and 15% Potassium as Potassium Sulfate, Aluminum Potassium Sulfate, and/or Potassium Silicate. Some such mineral complexes can further include one or more minerals selected from Zinc, Iron, Iron Sulfate, Manganese, Copper, Boron, Molybdenum, Selenium, and Nickel.

In more embodiments, a mineral complex can contain about 8% Potassium, about 50% Sulfur, about 17% Calcium Sulfate. Some such mineral complexes can also contain about 2% micronutrients, where the micronutrients can include one or more minerals selected from Iron, Zinc, Copper, Manganese, Boron, Magnesium, Sodium, and Molybdenum. In even more embodiments, a mineral complex can contain about 8% Sulfate, about 7% Sulfur Trioxide, about 16% elemental Sulfur, about 9% Potash, about 2% Bisulfite, and about 3.4% Thiosulfite. It will be understood that some of the mineral complexes described herein can further include *Thiobacillus* spp, which may be resident to said mineral complex or added exogenously thereto.

A variety of organic wastes can be blended with the mineral complexes described herein to provide soil amendments. As used herein "organic waste" and grammatical equivalents thereof, can refer to substrates that can be composted. Sources of organic waste include manure, green waste, municipal solid waste, sewage, food and agricultural waste, and industrial organic waste. Manures can include manure produced by humans and various animals, including farm animals, such as, cows, sheep, horses, pigs, goats, rabbits, and poultry such as chickens, turkeys, and ducks. Green waste can include a variety of substrates from several sources such as yard wastes including grass clippings, tree, brush and hedge trimmings, and leaves, as well as domestic and commercial food waste. Municipal solid wastes can include residential and commercial refuse, such as paper, wood, food and yard wastes. In preferred embodiments, substrates that may be composted can be separated from commingled non-compostable matter. In some embodiments, sewage sludge can be used as a source of organic waste.

The food processing and agricultural industries provide additional sources for organic waste that may be used to provide soil amendments. Generally, food and agricultural wastes can include vegetable and animal matter that may be composted. Illustrative examples include, cranberry and prune wastes; cull potatoes (bruised, diseased, or too small to use), potato skins; fish wastes including lobster shells, crab shells and viscera, scallop viscera, whole fish, and fish scraps; orange and citrus culls; apple processing residues including apple pomace, apple filter cake and biological sludge; wine processing wastes such as grape pomace and filter residues; and agricultural residues including rice hulls, straws, corn cobs, cotton gin trash, and almond hulls. Industries such as the food, textile, pulp and paper, and pharmaceutical industries may also produce organic wastes that may be blended with mineral complexes to provide soil amendments. Such organic wastes can include cotton, wool, cellulose fibers, and fungal mycelia from antibiotic production.

As will be understood, organic waste used to produce the soil amendments provided herein can be derived from one or more sources. In some embodiments, an organic waste used to produce a soil amendment can comprise manure. In more embodiments, an organic waste used to produce a soil amendment can comprise a green waste, municipal solid waste, or sewage. In some embodiments, an organic waste can comprise a mixture of manure and green waste, where the manure and green waste are blended at a ratio of about 1:5, 1:4, 1:3, 1:2, 1:1, 2:1, 3:1, 4:1, and 5:1. In preferred embodiments, an organic waste can comprise a mixture of manure and green waste, where the manure and green waste are blended at a ratio of about 1:1. In more embodiments, an organic waste can comprise a mixture of manure and green waste, municipal solid waste, or sewage, where the manure and green waste, municipal solid waste, or sewage are blended at a ratio of about 1:5, 1:4, 1:3, 1:2, 1:1, 2:1, 3:1, 4:1, and 5:1.

Mineral complexes may be blended with organic wastes at a variety of rates and ratios to produce soil amendments. In certain embodiments, soil amendments may be produced by blending a mineral complex at a rate of about 1, 2, 3, 4, 5, 6, 7, 8, 9, 10, 11, or 12 tons per 24 ton portion of the soil amendment. In particular embodiments, soil amendments may be produced by blending a mineral complex and organic waste at a ratio of about 1:200, 1:100, 1:50 1:20, 1:10, 1:9, 1:8, 1:7, 1:6, 1:5, 1:4, 1:3, 1:2, and 1:1. In preferred embodiments, a mineral complex can be blended with an organic waste at a ratio of about 1:5, 1:4, 1:3, 1:2, and 1:1.

Typically, the soil amendments provided can have an increased Ammonium Nitrate and/or Ammonium Sulfate content that can be particularly advantageous for plant growth. In certain embodiments, soil amendments can have an available nitrogen content of about 15 lb/yard$^3$, 16 lb/yard$^3$, 17 lb/yard$^3$, 18 lb/yard$^3$, 19 lb/yard$^3$, 20 lb/yard$^3$, 21 lb/yard$^3$, 22 lb/yard$^3$, 23 lb/yard$^3$, 24 lb/yard$^3$, 25 lb/yard$^3$, 26 lb/yard$^3$, 27 lb/yard$^3$, 28 lb/yard$^3$, 29 lb/yard$^3$, 30 lb/yard$^3$, 31 lb/yard$^3$, 32 lb/yard$^3$, 33 lb/yard$^3$, 34 lb/yard$^3$, and 35 lb/yard$^3$.

Certain embodiments include containers comprising the soil amendments provided herein. Examples of containers include, but are not limited to, boxes, crates, and bags. Containers can comprise soil amendment, wherein the amount of soil amendment can be less than, greater than, equal to or any number in between about 1 lb, 5 lb, 10 lb, 15 lb, 20 lb, 25 lb, 30 lb, 35 lb, 40 lb, 45 lb, 50 lb, 55 lb, 60 lb, 65 lb, 70 lb, 75 lb, 80 lb, 85 lb, 90 lb, 95 lb, 100 lb, and 500 lb. The following section provides more disclosure on methods to improve crop yield and better tasting fruits and vegetables.

Methods for Increasing Plant Growth

Some embodiments include methods for improving plant growth. The soil amendments provided herein are particularly advantageous by providing increased amounts of available nitrogen, such as ammonium for improved plant growth. Particular methods can include contacting a plant, a plant medium such as soil, with a soil amendment described herein. In some embodiments, a soil amendment can be applied to a field, garden, lawn, and/or flower bed.

Some methods can include identifying and/or selecting a soil that may benefit from an application of a soil amendment to improve plant growth. Such methods include testing the nutrient content of a soil, such as the amount of available nitrogen. Measuring the available nitrogen content of a soil and a soil amendment can be use to determine the amount and rate at which a soil amendment may be applied to a soil. Other factors can include the type of plant that will be grown. For example, particular crops may require different levels of available nitrogen for an increase in growth to be observed. In certain embodiments, the pH of a soil can determine the amount and rate at which a soil amendment may be applied to a soil.

In particular embodiments, a soil amendment may be applied at a rate of about 400 lb/acre, 410 lb/acre, 420 lb/acre, 430 lb/acre, 440 lb/acre, 450 lb/acre, 460 lb/acre, 470 lb/acre, 480 lb/acre, 490 lb/acre, 500 lb/acre, 510 lb/acre, 520 lb/acre, 530 lb/acre, 540 lb/acre, 550 lb/acre, 560 lb/acre, 570 lb/acre, 580 lb/acre, 590 lb/acre, 600 lb/acre, 610 lb/acre, 620 lb/acre, 630 lb/acre, 640 lb/acre, 650 lb/acre, 660 lb/acre, 670 lb/acre, 680 lb/acre, 690 lb/acre, 700 lb/acre, 710 lb/acre, 720 lb/acre, 730 lb/acre, 740 lb/acre, 750 lb/acre, 760 lb/acre, 770 lb/acre, 780 lb/acre, 790 lb/acre, 800 lb/acre, 810 lb/acre, 820 lb/acre, 830 lb/acre, 840 lb/acre, 850 lb/acre, 860 lb/acre, 870 lb/acre, 880 lb/acre, 890 lb/acre, and 900 lb/acre to a soil, where the soil has a pH of about 6.3-6.8.

In more embodiments, a soil amendment may be applied at a rate of about 700 lb/acre, 710 lb/acre, 720 lb/acre, 730 lb/acre, 740 lb/acre, 750 lb/acre, 760 lb/acre, 770 lb/acre, 780 lb/acre, 790 lb/acre, and 800 lb/acre, 810 lb/acre, 820 lb/acre, 830 lb/acre, 840 lb/acre, 850 lb/acre, 860 lb/acre, 870 lb/acre, 880 lb/acre, 890 lb/acre, 900 lb/acre, 910 lb/acre, 920 lb/acre, 930 lb/acre, 940 lb/acre, 950 lb/acre, 960 lb/acre, 970 lb/acre, 980 lb/acre, 990 lb/acre, 1000 lb/acre, 1010 lb/acre, 1020 lb/acre, 1030 lb/acre, 1040 lb/acre, 1050 lb/acre, 1060 lb/acre, 1070 lb/acre, 1080 lb/acre, 1090 lb/acre, and 1100 lb/acre to a soil, where the soil has a pH of about 6.8-7.3.

In more embodiments, a soil amendment may be applied at a rate of about 900 lb/acre, 910 lb/acre, 920 lb/acre, 930 lb/acre, 940 lb/acre, 950 lb/acre, 960 lb/acre, 970 lb/acre, 980 lb/acre, 990 lb/acre, 1000 lb/acre, 1010 lb/acre, 1020 lb/acre, 1030 lb/acre, 1040 lb/acre, 1050 lb/acre, 1060 lb/acre, 1070 lb/acre, 1080 lb/acre, 1090 lb/acre, 1100 lb/acre, 1110 lb/acre, 1120 lb/acre, 1130 lb/acre, 1140 lb/acre, 1150 lb/acre, 1160 lb/acre, 1170 lb/acre, 1180 lb/acre, 1190 lb/acre, 1200 lb/acre, 1210 lb/acre, 1220 lb/acre, 1230 lb/acre, 1240 lb/acre, 1250 lb/acre, 1260 lb/acre, 1270 lb/acre, 1280 lb/acre, 1290 lb/acre, 1300 lb/acre, 1310 lb/acre, 1320 lb/acre, 1330 lb/acre, 1340 lb/acre, 1350 lb/acre, 1360 lb/acre, 1370 lb/acre, 1380 lb/acre, 1390 lb/acre, 1400 lb/acre, 1410 lb/acre, 1420 lb/acre, 1430 lb/acre, 1440 lb/acre, 1450 lb/acre, 1460 lb/acre, 1460 lb/acre, 1480 lb/acre, 1490 lb/acre, 1500 lb/acre, 1510 lb/acre, 1520 lb/acre, 1530 lb/acre, 1540 lb/acre, 1550 lb/acre, 1560 lb/acre, 1570 lb/acre, 1580 lb/acre, 1590 lb/acre, 1600 lb/acre, 1610 lb/acre, 1620 lb/acre, 1630 lb/acre, 1640 lb/acre, 1650 lb/acre, 1660 lb/acre, 1670 lb/acre, 1680 lb/acre, 1690 lb/acre, 1700 lb/acre, 1710 lb/acre, 1720 lb/acre, 1730 lb/acre, 1740 lb/acre, 1750 lb/acre, 1760 lb/acre, 1770 lb/acre, 1780 lb/acre, 1790 lb/acre, 1800 lb/acre, 1810 lb/acre, 1820 lb/acre, 1830 lb/acre, 1840 lb/acre, 1850 lb/acre, 1860 lb/acre, 1870 lb/acre, 1880 lb/acre, 1890 lb/acre, 1900 lb/acre, 1910 lb/acre, 1920 lb/acre, 1930 lb/acre, 1940 lb/acre, 1950 lb/acre, 1960 lb/acre, 1970 lb/acre, 1980 lb/acre, 1990 lb/acre, 2000 lb/acre, 2010 lb/acre, 2010 lb/acre, 2020 lb/acre, 2030 lb/acre, 2040 lb/acre, 2050 lb/acre, 2060 lb/acre, 2070 lb/acre, 2080 lb/acre, 2090 lb/acre, and 2100 lb/acre to a soil, where the soil has a pH of about 7.3-7.7.

In more embodiments, a soil amendment may be applied at a rate of about 2100 lb/acre, 2110 lb/acre, 2120 lb/acre, 2130 lb/acre, 2140 lb/acre, 2150 lb/acre, 2160 lb/acre, 2170 lb/acre, 2180 lb/acre, 2190 lb/acre, 2200 lb/acre, 2210 lb/acre, 2220 lb/acre, 2230 lb/acre, 2240 lb/acre, 2250 lb/acre, 2260 lb/acre, 2270 lb/acre, 2280 lb/acre, 2290 lb/acre, 2300 lb/acre, 2310 lb/acre, 2320 lb/acre, 2330 lb/acre, 2340 lb/acre, 2350 lb/acre, 2360 lb/acre, 2370 lb/acre, 2380 lb/acre, 2390 lb/acre, 2400 lb/acre, 2410 lb/acre, 2420 lb/acre, 2430 lb/acre, 2440 lb/acre, 2450 lb/acre, 2460 lb/acre, 2460 lb/acre, 2480 lb/acre, 2490 lb/acre, 2500 lb/acre, 2510 lb/acre, 2520 lb/acre, 2530 lb/acre, 2540 lb/acre, 2550 lb/acre, 2560 lb/acre, 2570 lb/acre, 2580 lb/acre, 2590 lb/acre, 2600 lb/acre, 2610 lb/acre, 2620 lb/acre, 2630 lb/acre, 2640 lb/acre, 2650 lb/acre, 2660 lb/acre, 2670 lb/acre, 2680 lb/acre, 2690 lb/acre, 2700 lb/acre, 2710 lb/acre, 2720 lb/acre, 2730 lb/acre, 2740 lb/acre, 2750 lb/acre, 2760 lb/acre, 2770 lb/acre, 2780 lb/acre, 2790 lb/acre, 2800 lb/acre, 2810 lb/acre, 2820 lb/acre, 2830 lb/acre, 2840 lb/acre, 2850 lb/acre, 2860 lb/acre, 2870 lb/acre, 2880 lb/acre, 2890 lb/acre, 2900 lb/acre, 2910 lb/acre, 2920 lb/acre, 2930 lb/acre, 2940 lb/acre, 2950 lb/acre, 2960 lb/acre, 2970 lb/acre, 2980 lb/acre, 2990 lb/acre, 3000 lb/acre, 3010 lb/acre, 3020 lb/acre, 3030 lb/acre, 3040 lb/acre, 3050 lb/acre, 3060 lb/acre, 3070 lb/acre, 3080 lb/acre, 3090 lb/acre, and 3100 lb/acre to a soil, where the soil has a pH of about 7.8-8.9.

Methods to apply a soil amendment to a soil are well known in the art. In one example, drop spreaders and spinner spreaders can be used. In some embodiments, soil amendments can be applied with plow-down, disking, injection, chiseling or knifing into the soil.

Some methods for improving plant growth can include measuring an increasing in plant growth. For example, an increase in crop yield, crop quality, and/or cell integrity can be measured. The following section provides more detail on the methods of making the soil amendments described herein.

Methods of Making Soil Amendments

Generally, the soil amendments described herein relate to composted materials. Accordingly, methods for making soil amendments can include blending organic waste with a mineral complex, and composting the blend to produce a soil amendment. The methods provided are particularly advantageous over traditional methods. For example, during traditional methods of making soil amendments, high volumes of gases such as Ammonia, Methane, and/or Carbon Dioxide may be produced. The production of such gases during composting can decrease available nitrogen in the end-product, and can increase noxious odors during composting. In addition, such gases can be harmful greenhouse gases.

Methods provided reduce the production of particular gases during composting. For example, in some methods, the volume of Ammonia produced is reduced. Without wishing to be bound by any one theory, the low pH during composting may promote the conversion of Ammonia to Ammonium, thus reducing evolution of Ammonia, reducing noxious odors, and increasing available nitrogen.

Some embodiments can include pre-processing mineral complexes and/or organic waste prior to blending. In certain embodiments, a mineral complex that may be used to make soil amendments include about 3%, 4%, 5%, 6%, 7%, 8, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% elemental Sulfur, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, and 90% Thiosulfate, about 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, and 70% Sulfate, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% Calcium Sulfate, about 3%, 4%, 5%, 6%, 7%, 8%, 9%, and 10% soluble Calcium, about 8%, 9%, 10%, 11%, 12%, 13%, 14%, and 15% Potassium as Potassium Sulfate, Aluminum Potassium Sulfate, and/or Potassium Silicate. Some such mineral complexes can further include one or more minerals selected from Zinc, Iron, Iron Sulfate, Manganese, Copper, Boron, Molybdenum, Selenium, and Nickel. In more embodiments, a mineral complex can contain about 8% Potassium, about 50% Sulfur, about 17% Calcium Sulfate. Some such mineral complexes can also contain about 2% micronutrients, where the micronutrients can include one or more minerals selected from Iron, Zinc, Copper, Manganese, Boron, Magnesium, Sodium, and Molybdenum. In even more embodiments, a mineral complex can contain about 8% Sulfate, about 7% Sulfur Trioxide, about 16% elemental Sulfur, about 9% Potash, about 2% Bisulfite, and about 3.4% Thiosulfite. Some of the mineral complexes described herein can further include *Thiobacillus* spp.

Mineral complexes can undergo pre-processing by grinding, milling and sizing the material. As will be understood, finer particles provide a larger surface area for mineral complexes to interact with organic waste, allowing more efficient dispersion and dissolution of soluble components in blending. In some embodiments, ore samples can be crushed using an impact crusher to material <3 inches, further ground, and screened for material <$\frac{1}{8}^{th}$ inch. In some embodiments, mineral complexes can be further milled and screened for particles using a screen with a mesh size of at least about 50 mesh, 100 mesh, 150 mesh, 200 mesh, 250 mesh, 300 mesh, 350 mesh, 400 mesh (US standard units).

Pre-processing of organic waste will depend on the nature of the waste. Sources of organic waste are described herein. Considerations for conditioning substrates for composting are provided in "The Practical Handbook of Compost Engineering" Roger T. Haug (1993) CRC Press, hereby expressly incorporated by reference in its entirety. In some embodiments, additional materials may be added to organic waste to condition the substrate for composting. For example, substrates that are too wet may have dry materials such as straw, sawdust, peat, rice hulls, cotton gin trash, yard wastes, and vermiculite added. In another example, bulking materials can be added to provide structural support and maintain airspaces, such as wood chips, pelleted refuse, peanut shells, and tree trimmings.

In some embodiments, the carbon-rich and nitrogen-rich content of organic wastes can be modulated. In preferred embodiments, an organic waste can be nitrogen-rich. For example, an organic waste can comprise a mixture of manure and green waste, where the manure and green waste are blended at a ratio of about 1:5, 1:4, 1:3, 1:2, 1:1, 2:1, 3:1, 4:1, and 5:1. In preferred embodiments, an organic waste can comprise a mixture of manure and green waste, where the manure and green waste are blended at a ratio of about 1:1. In more embodiments, an organic waste can comprise a mixture of manure and green waste, municipal solid waste, or sewage, where the manure and green waste, municipal solid waste, or sewage are blended at a ratio of about 1:5, 1:4, 1:3, 1:2, 1:1, 2:1, 3:1, 4:1, and 5:1. In preferred embodiments, organic waste comprises manure. In more preferred embodiments, organic waste comprises cow manure.

Organic wastes and mineral complexes can be blended by a variety of methods. Such methods are well known in the art. Mineral complexes may be blended with organic wastes at a variety of rates and ratios to produce soil amendments. In certain embodiments, soil amendments may be produced by blending a mineral complex at a rate of about 1, 2, 3, 4, 5, 6, 7, 8, 9, 10, 11, or 12 tons per 24 ton portion of the soil amendment. In particular embodiments, soil amendments may be produced by blending a mineral complex and organic waste at a ratio of about 1:200, 1:100, 1:50 1:20, 1:10, 1:9, 1:8, 1:7, 1:6, 1:5, 1:4, 1:3, 1:2, and 1:1. In preferred embodiments, a mineral complex can be blended with an organic waste at a ratio of about 1:5, 1:4, 1:3, 1:2, and 1:1.

Methods for making soil amendments described herein can be applied to various composting methods and systems. It should be understood that the methods can be performed at any scale, for example, methods for making soil amendments can be carried out at industrial scales where many tons are processed, to non-commercial scales where tens of pounds may be processed. Systems can include nonreactor processes and reactor processes. Nonreactor processes can include window processes and static pile processes. Reactor processes can include vertical flow processes and horizontal and inclined flow processes. Systems can be batch systems or continuous systems. Examples of such systems can be found in "The Practical Handbook of Compost Engineering" Roger T. Haug (1993) CRC Press, hereby expressly incorporated by reference in its entirety. More systems and methods of composting are well known in the art.

Some forms of composting can include two phases. A first stage characterized by high oxygen uptake rates, thermophilic temperatures, high biodegradable volatile solids reduction, and higher odor potential. A second stage can be characterized by lower temperatures, reduced oxygen uptake rates, and lower odor production potential. The stages of composting can be identified by measuring various characteristics of the composting material before, during, and/or subsequent to composting. Such characteristics may be used to establish the stability and maturity of a soil amendment during and/or subsequent to composting. Examples of characteristics can include particle size, texture, color, odor, moisture content, and general appearance of the composting material and/or resulting soil amendment. More examples can include specific oxygen consumption rate, presence or absence of phytotoxic compounds, reduction of biodegradable volatile solids, reduction in pathogenic organisms, pH, temperature of the composting material and/or resulting soil amendment can be measured. In some embodiments, nutrient content, nitrate/ammonia ratio, absence of readily degradable compounds such as starch, absence of anaerobic intermediates such as acetic acid, heavy metal content, and/or the effect on seed germination of the composting material and/or resulting soil amendment can be measured. In even more embodiments, gases evolved from the composting material before, during, and/or subsequent to composting, examples of such gases can include methane, ammonia, nitrous oxide, and carbon dioxide can be measured. In preferred embodiments, the amount Ammonium Nitrate and/or Ammonium Sulfate can be measured in the composting material and/or resulting soil amendment. In certain embodiments, pH can be measured before, during and/or subsequent to composting. In certain embodiments, a soil amendment can have a pH of about 3, 4, 5, 6, 7, 8, and 9.

Composting can proceed until a desired endpoint is reached. In some embodiments, composting of an organic waste and mineral complex can occur for a period of time comprising at least about 9 days, 10 days, 11 days, 12 days, 13 days, 14 days, 15 days, 16 days, 17 days, 18 days, 19 days, 20 days, 21, days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 45 days, 50 days, 55 days, 60 days, 65 days, 70 days, 75 days, 80 days, 85 days, 90 days, 95 days, and 100 days. In preferred embodiments, composting of an organic waste and mineral complex can occur for a period of at least about 12 days.

Methods provided herein can further include bagging soil amendments. Soil amendments can be bagged into containers. Examples of containers include, but are not limited to, boxes, crates, and bags. Containers can comprise soil amendment, wherein the amount of soil amendment can be less than, greater than, equal to or any number in between about 1 lb, 5 lb, 10 lb, 15 lb, 20 lb, 25 lb, 30 lb, 35 lb, 40 lb, 45 lb, 50 lb, 55 lb, 60 lb, 65 lb, 70 lb, 75 lb, 80 lb, 85 lb, 90 lb, 95 lb, 100 lb, and 500 lb.

Some methods of making soil amendments are particularly advantageous for inhibiting the growth of pathogenic microbes that may be present in organic waste. These methods have the advantages of providing soil amendments that may be free from particular pathogenic microbes, and of eliminating pathogenic microbes from organic waste and the environment. The microbes will vary according to the source of organic waste and may include, for example, coliform bacteria, *Escherichia coli*, *Salmonella* spp., *Salmonella enterai*, *Salmonella typhimrium*, *Shigella* spp., *Shigella dysenteriae*, *Shigella sonnei*, *Shigella flexneri*, *Bacillus pasteuri*, *Bacillus anthracis*, *Vibrio cholerae*, *Brucella abortus*, *Brucella suis*, *Brucella melitensis*, *Mycobacterium tuberculosis*, *Leptospira interohaemorrhagiae*, *Leptospira canicola*, *Leptospira pomona*, *Yersinia enterocolitica*, and *Campylobacter jejuni*. It will be understood that pathogenic microbes can include protozoa such as *Entamoeba histolytica*, *Giardia lamblia*; fungi; and viruses such as hepatitis type A, reovirus, adenovirus, echovirus, coxsackievirus.

Typically, elevated temperatures attained during composting can destroy pathogens. However, it has been unexpectedly found that methods described herein can be used to inhibit the growth of pathogenic microbes through additional chemical processes related to mineral complexes. Without wishing to be bound to any one theory, the pH of blended organic waste and mineral complex during composting may be reduced such that growth of pathogenic microbes is inhibited. In some such embodiments, elevated temperatures need not be attained to destroy particular pathogenic microbes. Accordingly, the period of time required to attain elevated temperatures may not be needed in some embodiments, thus the total time for composting can be reduced significantly.

Some methods for making soil amendments can be particularly advantageous for reducing odors typically produced in composting. Odors may be particularly significant where composting occurs anaerobically. Where anaerobic composting occurs, metabolic end products can include methane, carbon dioxide and numerous low molecular weight intermediates such as organic acids and alcohols. However, some of the methods provided herein reduce the amount of odor produced during composting. In particular embodiments, the volume of gases such as ammonia is significantly reduced. In more embodiments, the volume of methane produced during composting is significantly reduced. The following section provides more detail on methods to reduce the presence of pathogenic bacteria.

Methods for Inhibiting Growth of Pathogenic Bacteria

Some embodiments include methods for inhibiting the growth of pathogenic microbes. In particular embodiments, the pathogenic microbes may be present in soil, organic waste, such as manure. Such pathogenic microbes can cause disease in humans and farm animals, leading to suffering and economic loss.

Generally, methods for inhibiting the growth of pathogenic microbes can include contacting a mineral complex to a soil. In some embodiments, soil can include organic waste, such as manure, such as cow manure. In some such embodiments, an effective amount of the mineral complex can be contacted to the soil. As used herein, an effective amount of a mineral complex to inhibit the pathogenic growth of microbes can refer to an amount that exhibits antimicrobial activity when applied to soil. The amount will vary according to the conditions of the soil and the period of time a mineral complex contacts the soil. The amount of mineral complex sufficient to inhibit growth of pathogenic microbes can be readily tested, for example, by measuring the presence of specific microbes in the soil, and/or measuring pH of the soil. In some embodiments, a mineral complex can be contacted to a soil to produce a pH of about 3, 4, 5, and 6, where the growth of particular pathogenic microbes may be inhibited.

In more embodiments, a mineral complex can be contacted to a soil for a period of time sufficient to inhibit growth of pathogenic microbes. In some embodiments, the period of time can be at least about 1 day, 5 days, 10 days, 15 days, 20 days, 25 days, 30 days, 35 days, 40 days, 45 days, 50 days, 55 days, 60 days, 65 days, 70 days, 75 days, 80 days, 85 days, 90 days, 95 days, and 100 days.

Mineral complexes that may be used to inhibit the growth of pathogenic microbes can include a mineral complex comprising about 3%, 4%, 5%, 6%, 7%, 8, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% elemental Sulfur, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, and 90% Thiosulfate, about 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, and 70% Sulfate, about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, and 35% Calcium Sulfate, about 3%, 4%, 5%, 6%, 7%, 8%, 9%, and 10% soluble Calcium, about 8%, 9%, 10%, 11%, 12%, 13%, 14%, and 15% Potassium as Potassium Sulfate, Aluminum Potassium Sulfate, and/or Potassium Silicate. Some such mineral complexes can further include one or more minerals selected from Zinc, Iron, Iron Sulfate, Manganese, Copper, Boron, Molybdenum, Selenium, and Nickel. In more embodiments, a mineral complex can contain about 8% Potassium, about 50% Sulfur, about 17% Calcium Sulfate. Some such mineral complexes can also contain about 2% micronutrients, where the micronutrients can include one or more minerals selected from Iron, Zinc, Copper, Manganese, Boron, Magnesium, Sodium, and Molybdenum. In even more embodiments, a mineral complex can contain about 8% Sulfate, about 7% Sulfur Trioxide, about 16% elemental Sulfur, about 9% Potash, about 2% Bisulfite, and about 3.4% Thiosulfite.

Examples of pathogenic microbes include coliform bacteria, *Escherichia coli, Salmonella* spp., *Salmonella enterai, Salmonella typhimurium, Shigella* spp., *Shigella dysenteriae, Shigella sonnei, Shigella flexneri, Bacillus pasteuri, Bacillus anthracis, Vibrio cholerae, Brucella abortus, Brucella suis, Brucella melitensis, Mycobacterium tuberculosis, Leptospira interohaemorrhagiae, Leptospira canicola, Leptospira pomona, Yersinia enterocolitica*, and *Campylobacter jejuni*. Pathogenic microbes can also include protozoa such as *Entamoeba histolytica, Giardia lamblia*; fungi; and viruses such as hepatitis type A, reovirus, adenovirus, echovirus, coxsackievirus. The following section provides more detail on methods of reducing algae growth and the odor associated therewith.

Methods for Reducing Algae Growth

Some embodiments include methods for reducing algae in a body of water. Bodies of water can include lakes and ponds. In preferred embodiments, a body of water comprises an effluent lagoon. Such effluent lagoons may contain organic waste such as sewage and manure. Typically, effluent lagoons contain high levels of phosphorus that promote algae growth. Algal blooms may be unsustainable and subsequently decomposed by bacteria that remove a high proportion of oxygen in the lagoon. In addition to causing deoxygenation, some algal species produce toxins that may contaminate drinking water supplies.

Some methods for reducing algae in a body of water, such as an effluent lagoon, can include selecting a body of water containing algae. In some embodiments, the body of water can contain levels of phosphorus that promote algal growth. In certain embodiments, methods for reducing algal growth in a body of water include contacting a mineral complex described herein to a body of water. In such methods, the amount of mineral complex can sufficient to inhibit algal growth, and/or to reduce the amount of phosphorus available for algal growth. In more such methods, the period of time that the mineral complex can be contacted to the body of water can be sufficient to inhibit algal growth, and/or to reduce the amount of phosphorus available for algal growth. In some embodiments, the period of time can be at least about 1 day, 5 days, 10 days, 15 days, 20 days, 25 days, 30 days, 35 days, 40 days. Methods of applying a mineral complex to a body of water, for example, an effluent lagoon, are well known in the art. Some methods for reducing algae in a body of water can include detecting a reduction in the presence of algae in the body of water. The following section provides more detail on methods of reducing the odor associated with organic wastes, such as manure, manure ponds, and waste water treatment facilities.

Methods for Reducing Odor

Some embodiments include methods and compositions for reducing noxious odors of organic waste, for example, manure, manure ponds, and waste water treatment facilities. Noxious odors can be produced from a variety of sources, for example, gases such as methane, hydrogen sulfide, and ammonia, and products such as alcohols, amines, aromatics, sulfides, terpenes, and organic acids. Methods for reducing odors can include contacting a mineral complex provided herein to an organic waste, such as manure, manure ponds, and waste water treatment facilities. In preferred embodiments, an effective amount of a mineral complex can be contacted to an organic waste to reduce the odor evolved from the organic waste, as compared to an untreated waste. An effective amount is an amount sufficient to reduce the amount of an odor. In some embodiments, the mineral complex may be contacted with the organic waste for a period of time sufficient to reduce an odor. In some embodiments, the period of time can be at least about 1 day, 5 days, 10 days, 15 days, 20 days, 25 days, 30 days, 35 days, 40 days.

Various methods can be used to contact a mineral complex with an organic waste. Methods will vary according to the type of organic waste used. In preferred embodiments, a mineral complex can be applied to manure ponds, and waste water treatment facilities. Examples of manures, manure ponds, and waste water treatment facilities can include manure produced by humans and various animals, including farm animals, such as, cows, sheep, horses, pigs, goats, rabbits, and poultry such as chickens, turkeys, and ducks.

EXAMPLES

Example 1

Improved Crop Yields with Soil Amendment

Soil amendments were prepared. Test amendments were prepared by composting a 1:2 ratio of mineral complex:manure for a composting cycle of 30 days. Traditional composts were prepared by composting manure only for a composting cycle of 60 days. Soil amendments included: control commercial fertilizer; 3 T traditional compost, applied at 3 ton/acre; 5 T traditional compost, applied at 5 ton/acre; 3 T test amendment, applied at 3 ton/acre; and 5 T test amendment, applied at 5 ton/acre. Soil amendments were applied to plots of land, potato plants were grown on each plot and the tubers harvested. Tuber set, tuber bulking, tuber size distribution, and total yield were evaluated.

Tubers grown with traditional compost treatments had a higher tuber set and higher yield than the control tubers. The 3 T test amendment and 5 T test amendment produced a higher yield of tubers than the 3 T traditional compost and 5 T traditional compost.

The 5 T test amendment and 5 T traditional compost had more premium size tubers than the 3 T test amendment and 3 T traditional compost. The 5 T test amendment produced a higher tuber set, with more premium size tubers and higher total yield than all treatments.

Example 2

Analysis of Soil Amendments

Test amendment and traditional compost were prepared and analyzed. Test amendment was prepared by blending a mineral complex and manure at a 1:2 ratio and composting for a cycle of 30 days. Traditional compost was prepared by composting manure for a cycle of 60 days. The test amendment had a lower pH than the traditional compost. The amount of total nitrogen was higher in the test amendment than in the traditional compost. In particular, the amount of exchangeable ammonium was higher in the test amendment than in the traditional compost. Table 1 shows the available nutrients in a sample of the test amendment, where the amount of an element or compound that can be extracted from a dry quantity of the test amendment was measured. Table 2 shows the results of a saturated extract analysis, where the available soluble nutrients, conductivity, and sodium adsorption ratio in a sample of the test amendment was measured. Table 3 shows physical characteristics of the test amendment. Table 4 shows the concentration of carbon, nitrogen, potassium oxide, phosphate, boron, chloride and sodium present in the test amendment. Table 5 shows the available nutrients in a sample of the traditional compost, where the amount of an element or compound that can be extracted from a dry quantity of the test amendment was measured. Table 6 shows the results of a saturated extract analysis, where the available soluble nutrients, conductivity, and sodium adsorption ratio in a sample of the traditional compost were measured. Table 7 shows physical characteristics of the traditional compost. Table 8 shows the concentration of carbon, nitrogen, potassium oxide, phosphate, boron, chloride and sodium present in a sample of the traditional compost.

TABLE 1

Test amendment

| Element | Extractable (mg/kg) | Total Content (mg/kg) | Available Nutrients (%) | Total Pounds per cubic yard |
| --- | --- | --- | --- | --- |
| phosphorus | 214.04 | 2,855.91 | 7.5% | 2.3477 |
| potassium | 33,976.16 | 36,693.58 | 92.6% | 30.1644 |
| iron | 66.08 | 6,304.34 | 1.0% | 5.1826 |
| manganese | 25.52 | 149.14 | 17.1% | 0.1226 |
| zinc | 6.26 | 64.01 | 9.8% | 0.0526 |
| copper | 0.45 | 23.36 | 1.9% | 0.0192 |
| boron | 21.66 | 49.83 | 43.5% | 0.0410 |
| calcium | 1,377.11 | 19,500.23 | 7.1% | 16.0304 |
| magnesium | 1,782.12 | 5,247.85 | 34.0% | 4.3141 |
| sodium | 4,573.33 | 4,814.43 | 95.0% | 3.9578 |
| sulfur | 19,171.82 | 39,842.73 | 48.1% | 32.7532 |
| molybdenum | 0.32 | 5.75 | 5.6% | 0.0047 |
| aluminum | 22.08 | 12,312.66 | 0.2% | 10.1218 |
| arsenic | 0.12 | 6.64 | 1.8% | 0.0055 |
| barium | nd | 163.83 | 0.0% | 0.1347 |
| cadmium | nd | 0.48 | 0.0% | 0.0004 |
| chromium | 0.46 | 18.38 | 2.5% | 0.0151 |
| cobalt | 0.73 | 2.19 | 33.4% | 0.0018 |
| lead | nd | 9.32 | 0.0% | 0.0077 |
| lithium | 1.70 | 18.17 | 9.3% | 0.0149 |
| mercury | nd | 0.10 | 0.0% | 0.0001 |
| nickel | 0.46 | 5.40 | 8.5% | 0.0044 |
| selenium | nd | nd | | 0.0000 |
| silicon | 7.68 | nd | | 0.0000 |
| silver | nd | nd | | 0.0000 |
| strontium | 5.54 | 168.88 | 3.3% | 0.1388 |
| tin | nd | nd | | 0.0000 |
| titanium | nd | 296.55 | | 0.2438 |
| vanadium | 3.13 | 631.62 | 0.5% | 0.5192 | nd: not determined.

TABLE 2

Test amendment

| Element | Extractable (mg/l) | Concentration (millieq/l) | Water Soluble Nutrients | Available (%) |
| --- | --- | --- | --- | --- |
| calcium | 1,450.5 | 72.5 | 2,536.3 | 184.2% |
| magnesium | 883.1 | 73.0 | 1,544.1 | 86.6% |
| sodium | 1,942.3 | 84.4 | 3,396.2 | 74.3% |
| ammonium as N | 7,915.8 | 565.4 | 13,841.0 | 70.5% |
| potassium | 8,054.7 | 206.0 | 14,083.9 | 41.5% |
| cation sum: | | 1001.4 | | |
| chloride | 5,878.6 | 165.6 | | |
| nitrate as N | 146.3 | 10.4 | 255.8 | |

TABLE 2-continued

Test amendment

| Element | Extractable (mg/l) | Concentration (millieq/l) | Water Soluble Nutrients | Available (%) |
|---|---|---|---|---|
| sulfate as S | 5,770.3 | 360.6 | 10,089.5 | 52.6% |
| phosphorus | 69.0 | 4.6 | 120.6 | 56.3% |
| anion sum: | | 541.3 | | |
| boron as B | 8.98 | | 15.7 | 72.5% | pH value: 6.93
Conductivity ECe (millimho/cm): 36.00
Sodium adsorption ratio: 9.0

TABLE 3

Test amendment

| Characteristic | Value |
|---|---|
| estimated. gypsum requirement (lb/cubic yard) | 9.7 |
| relative infiltration rate | fair/slow |
| percent organic matter-dry weight basis | 36.63% |
| percent total nitrogen-dry weight basis | 1.98% |
| percent total carbon-dry weight basis | 11.40% |
| carbon:nitrogen ratio | 5.8 |
| lime (calcium carbonate) | no |
| percent water/total basis | 35.1% |
| percent water on a dry weight basis | 54.2% |
| half saturation percentage | 87.4% |
| bulk density - pounds per cubic yard | 1,267 |
| exchangeable ammonium - mg/kg dry weight basis | 19,645 |
| acid-soluble ash | 19.3% |
| acid-insoluble ash | 44.0% |

TABLE 4

Test amendment

| Element or compound | lb/cubic yard | As is basis |
|---|---|---|
| carbon | 93.73 | |
| nitrogen | 16.30 | Total: 1.29% |
| | | nitrate: 0.02% |
| | | ammonium: 1.27% |
| | | organic N: 0.00% |
| $P_2O_5$ | 5.38 | 0.42% |
| $K_2O$ | 36.35 | 2.87% |
| chloride | 8.45 | |
| boron | 0.04 | |
| sodium | 3.96 | |

TABLE 5

Traditional compost

| Element | Extractable (mg/kg) | Total Content (mg/kg) | Available Nutrients (%) | Total Pounds per cubic yard |
|---|---|---|---|---|
| phosphorus | 556.21 | 6,447.04 | 8.6% | 5.4049 |
| potassium | 12,890.31 | 29,588.97 | 43.6% | 24.8060 |
| iron | 78.39 | 6,263.21 | 1.3% | 5.2508 |
| manganese | 29.47 | 282.95 | 10.4% | 0.2372 |
| zinc | 68.94 | 238.69 | 28.9% | 0.2001 |
| copper | 8.91 | 67.02 | 13.3% | 0.0562 |
| boron | 13.00 | 44.47 | 29.2% | 0.0373 |
| calcium | 1,534.43 | 22,817.88 | 6.7% | 19.1294 |
| magnesium | 228.27 | 7,766.93 | 2.9% | 6.5114 |
| sodium | 2,993.78 | 5,319.05 | 56.3% | 4.4592 |
| sulfur | 1,807.00 | 6,960.30 | 26.0% | 5.8352 |

TABLE 5-continued

Traditional compost

| Element | Extractable (mg/kg) | Total Content (mg/kg) | Available Nutrients (%) | Total Pounds per cubic yard |
|---|---|---|---|---|
| molybdenum | 1.50 | 2.26 | 66.4% | 0.0019 |
| aluminum | 3.34 | 4,722.65 | 0.1% | 3.9592 |
| arsenic | 1.03 | 4.04 | 25.5% | 0.0034 |
| barium | 0.80 | 82.53 | 1.0% | 0.0692 |
| cadmium | 0.10 | 0.80 | 12.8% | 0.0007 |
| chromium | 0.15 | 6.87 | 2.1% | 0.0058 |
| cobalt | 0.05 | 3.23 | 1.4% | 0.0027 |
| lead | 2.04 | 18.03 | 11.3% | 0.0151 |
| lithium | 1.43 | 24.15 | 5.9% | 0.0202 |
| mercury | nd | nd | | 0.0000 |
| nickel | 0.42 | 7.93 | 5.3% | 0.0066 |
| selenium | nd | nd | | 0.0000 |
| silicon | 19.71 | nd | | 0.0000 |
| silver | nd | nd | | 0.0000 |
| strontium | 7.33 | 173.66 | 4.2% | 0.1456 |
| tin | nd | nd | | 0.0000 |
| titanium | 0.38 | 264.79 | | 0.2220 |
| vanadium | 1.24 | 227.71 | 0.5% | 0.1909 | nd: not determined

TABLE 6

Traditional compost

| Element | Extractable (mg/l) | Concentration (millieq/l) | Water Soluble Nutrients | Available (%) |
|---|---|---|---|---|
| calcium | 87.6 | 4.4 | 147.7 | 9.6% |
| magnesium | 23.7 | 2.0 | 39.9 | 17.5% |
| sodium | 1,604.7 | 69.8 | 2,704.8 | 90.3% |
| ammonium as N | 470.0 | 33.6 | 792.2 | 38.4% |
| potassium | 8,087.7 | 206.8 | 13,632.2 | 105.8% |
| cation sum: | | 316.5 | | |
| chloride | 7,004.1 | 197.3 | | |
| nitrate as N | 148.2 | 10.6 | 249.7 | |
| sulfate as S | 1,028.3 | 64.3 | 1,733.3 | 95.9% |
| phosphorus | 81.4 | 5.4 | 137.1 | 24.7% |
| anion sum: | | 277.6 | | |
| boron as B | 5.42 | | 0.1 | 70.3% | pH value: 8.92
Conductivity ECe (millimho/cm): 27.90
Sodium adsorption ratio: 39.3

TABLE 7

Traditional compost

| Characteristic | Value |
|---|---|
| estimated gypsum requirement (lb/cubic yard) | 6.4 |
| relative infiltration rate | very slow |
| percent organic matter-dry weight basis | 39.68% |
| percent total nitrogen-dry weight basis | 1.30% |
| percent total carbon-dry weight basis | 14.85% |
| carbon:nitrogen ratio | 11.5 |
| lime (calcium carbonate) | yes |
| percent water/total basis | 37.0% |
| percent water on a dry weight basis | 58.8% |
| half saturation percentage | 84.3% |
| bulk density - pounds per cubic yard | 1,331 |
| exchangeable ammonium - mg/kg dry weight basis | 2,064 |
| acid-soluble ash | 12.9% |
| acid-insoluble ash | 47.5% |

TABLE 8

Traditional compost

| Element or compound | lb/cubic yard | As is basis |
|---|---|---|
| carbon | 124.51 | |
| nitrogen | 10.87 | Total: 0.82% |
| | | nitrate: 0.03% |
| | | ammonium: 0.13% |
| | | organic N: 0.67% |
| $P_2O_5$ | 12.39 | 0.93% |
| $K_2O$ | 29.89 | 2.25% |
| chloride | 9.90 | |
| boron | 0.04 | |
| sodium | 4.46 | |

Example 3

Analysis of Soil Amendments

Test amendment and traditional compost were prepared and analyzed. Test amendment was prepared by blending a mineral complex and manure at a 1:2 ratio and composting for a cycle of 30 days. Traditional compost was prepared by composting manure for a cycle of 60 days. The concentrations of particular elements and compounds in a sample of the test amendment and traditional compost were measured. Tables 9 and 10 show the concentration of nutrients that would be available on addition of particular quantities of the test amendment to an area of land. Tables 11 and 12 show the concentrations of nutrients that would be available on addition of particular quantities of the traditional compost to an area of land.

TABLE 9

Test amendment

| Element | Total addition (lb/per cubic yard) | Application rate in cubic yards per 1,000 square feet | | | | | | |
|---|---|---|---|---|---|---|---|---|
| | | 1 | 2 | 3 | 4 | 5 | 6 | 7 |
| nitrogen | 16.296 | 16.3 | 32.6 | 48.9 | 65.2 | 81.5 | 97.8 | 114.1 |
| $P_2O_5$ | 5.381 | 5.4 | 10.8 | 16.1 | 21.5 | 26.9 | 32.3 | 37.7 |
| $K_2O$ | 36.348 | 36.3 | 72.7 | 109.0 | 145.4 | 181.7 | 218.1 | 254.4 |
| iron | 5.183 | 5.2 | 10.4 | 15.5 | 20.7 | 25.9 | 31.1 | 36.3 |
| manganese | 0.123 | 0.1 | 0.2 | 0.4 | 0.5 | 0.6 | 0.7 | 0.9 |
| zinc | 0.053 | 0.1 | 0.1 | 0.2 | 0.2 | 0.3 | 0.3 | 0.4 |
| copper | 0.019 | 0.0 | 0.0 | 0.1 | 0.1 | 0.1 | 0.1 | 0.1 |
| boron | 0.041 | 0.0 | 0.1 | 0.1 | 0.2 | 0.2 | 0.2 | 0.3 |
| calcium | 16.030 | 16.0 | 32.1 | 48.1 | 64.1 | 80.2 | 96.2 | 112.2 |
| magnesium | 4.314 | 4.3 | 8.6 | 12.9 | 17.3 | 21.6 | 25.9 | 30.2 |
| sodium | 3.958 | 4.0 | 7.9 | 11.9 | 15.8 | 19.8 | 23.7 | 27.7 |
| sulfur | 32.753 | 32.8 | 65.5 | 98.3 | 131.0 | 163.8 | 196.5 | 229.3 |
| molybdenum | 0.00473 | 0.0 | 0.0 | 0.0 | 0.0 | 0.0 | 0.0 | 0.0 |
| Increase in Salinity if incorporated 6" deep | | 1.95 | 3.89 | 5.84 | 7.78 | 9.73 | 11.68 | 13.62 |

TABLE 10

Test Amendment

| Element | Total addition (lb/per ton) | Application rate in tons per acre | | | | | | |
|---|---|---|---|---|---|---|---|---|
| | | 1 | 3 | 5 | 8 | 10 | 12 | 15 |
| nitrogen | 25.72 | 25.72 | 77.15 | 128.59 | 205.74 | 257.17 | 308.61 | 385.76 |
| phosphorus | 8.49 | 8.49 | 25.48 | 42.46 | 67.93 | 84.92 | 101.90 | 127.38 |
| potassium | 57.36 | 57.36 | 172.08 | 286.80 | 458.89 | 573.61 | 688.33 | 860.41 |
| iron | 8.18 | 8.18 | 24.54 | 40.89 | 65.43 | 81.79 | 98.14 | 122.68 |
| manganese | 0.19 | 0.19 | 0.58 | 0.97 | 1.55 | 1.93 | 2.32 | 2.90 |
| zinc | 0.08 | 0.08 | 0.25 | 0.42 | 0.66 | 0.83 | 1.00 | 1.25 |
| copper | 0.03 | 0.03 | 0.09 | 0.15 | 0.24 | 0.30 | 0.36 | 0.45 |
| boron | 0.06 | 0.06 | 0.19 | 0.32 | 0.52 | 0.65 | 0.78 | 0.97 |
| calcium | 25.30 | 25.30 | 75.89 | 126.49 | 202.38 | 252.98 | 303.57 | 379.46 |
| magnesium | 6.81 | 6.81 | 20.42 | 34.04 | 54.46 | 68.08 | 81.70 | 102.12 |
| sodium | 6.25 | 6.25 | 18.74 | 31.23 | 49.97 | 62.46 | 74.95 | 93.69 |
| sulfur | 51.69 | 51.69 | 155.06 | 258.44 | 413.50 | 516.88 | 620.25 | 775.32 |
| molybdenum | 0.01 | 0.01 | 0.02 | 0.04 | 0.06 | 0.07 | 0.09 | 0.11 |
| Increase in Salinity if incorporated 6" deep | | 0.07 | 0.21 | 0.35 | 0.56 | 0.70 | 0.84 | 1.06 |

Bulk Density (lb/cubic yard): 1,267
salinity (millimho/cm): 36.00

TABLE 11

Traditional compost

| Element | Total Addition (lb/per cubic yard) | Application rate in cubic yards per 1,000 square feet | | | | | | |
|---|---|---|---|---|---|---|---|---|
| | | 1 | 2 | 3 | 4 | 5 | 6 | 7 |
| nitrogen | 10.873 | 10.9 | 21.7 | 32.6 | 43.5 | 54.4 | 65.2 | 76.1 |
| $P_2O_5$ | 12.388 | 12.4 | 24.8 | 37.2 | 49.6 | 61.9 | 74.3 | 86.7 |
| $K_2O$ | 29.891 | 29.9 | 59.8 | 89.7 | 119.6 | 149.5 | 179.3 | 209.2 |
| iron | 5.251 | 5.3 | 10.5 | 15.8 | 21.0 | 26.3 | 31.5 | 36.8 |
| manganese | 0.237 | 0.2 | 0.5 | 0.7 | 0.9 | 1.2 | 1.4 | 1.7 |
| zinc | 0.200 | 0.2 | 0.4 | 0.6 | 0.8 | 1.0 | 1.2 | 1.4 |
| copper | 0.056 | 0.1 | 0.1 | 0.2 | 0.2 | 0.3 | 0.3 | 0.4 |
| boron | 0.037 | 0.0 | 0.1 | 0.1 | 0.1 | 0.2 | 0.2 | 0.3 |
| calcium | 19.129 | 19.1 | 38.3 | 57.4 | 76.5 | 95.6 | 114.8 | 133.9 |
| magnesium | 6.511 | 6.5 | 13.0 | 19.5 | 26.0 | 32.6 | 39.1 | 45.6 |
| sodium | 4.459 | 4.5 | 8.9 | 13.4 | 17.8 | 22.3 | 26.8 | 31.2 |
| sulfur | 5.835 | 5.8 | 11.7 | 17.5 | 23.3 | 29.2 | 35.0 | 40.8 |
| molybdenum | 0.00190 | 0.0 | 0.0 | 0.0 | 0.0 | 0.0 | 0.0 | 0.0 |
| Increase in Salinity if incorporated 6" deep | | 1.51 | 3.02 | 4.52 | 6.03 | 7.54 | 9.05 | 10.56 |

TABLE 12

Traditional compost

| Element | Total Addition (lb/per ton) | Application rate in tons per acre | | | | | | |
|---|---|---|---|---|---|---|---|---|
| | | 1 | 3 | 5 | 8 | 10 | 12 | 15 |
| nitrogen | 16.34 | 16.34 | 49.02 | 81.69 | 130.71 | 163.39 | 196.06 | 245.08 |
| phosphorus | 18.61 | 18.61 | 55.84 | 93.07 | 148.92 | 186.15 | 223.38 | 279.22 |
| potassium | 44.92 | 44.92 | 134.75 | 224.58 | 359.33 | 449.16 | 538.99 | 673.74 |
| iron | 7.89 | 7.89 | 23.67 | 39.45 | 63.12 | 78.90 | 94.68 | 118.35 |
| manganese | 0.36 | 0.36 | 1.07 | 1.78 | 2.85 | 3.56 | 4.28 | 5.35 |
| zinc | 0.30 | 0.30 | 0.90 | 1.50 | 2.41 | 3.01 | 3.61 | 4.51 |
| copper | 0.08 | 0.08 | 0.25 | 0.42 | 0.68 | 0.84 | 1.01 | 1.27 |
| boron | 0.06 | 0.06 | 0.17 | 0.28 | 0.45 | 0.56 | 0.67 | 0.84 |
| calcium | 28.74 | 28.74 | 86.23 | 143.72 | 229.96 | 287.45 | 344.94 | 431.17 |
| magnesium | 9.78 | 9.78 | 29.35 | 48.92 | 78.27 | 97.84 | 117.41 | 146.76 |
| sodium | 6.70 | 6.70 | 20.10 | 33.50 | 53.60 | 67.01 | 80.41 | 100.51 |
| sulfur | 8.77 | 8.77 | 26.30 | 43.84 | 70.15 | 87.68 | 105.22 | 131.52 |
| molybdenum | 0.00 | 0.00 | 0.01 | 0.01 | 0.02 | 0.03 | 0.03 | 0.04 |
| Increase in Salinity if incorporated 6" deep | | 0.05 | 0.16 | 0.26 | 0.42 | 0.52 | 0.62 | 0.78 |

Bulk Density (lb/cubic yard): 1,331
salinity (millimho/cm): 27.90

The above description discloses several methods and systems of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein including, but not limited to, published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

What is claimed is:

1. A soil amendment comprising:
   a blend of organic waste and a mineral complex that comprises about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium Sulfate, Aluminum Potassium Sulfate, and Potassium Silicate, Zinc, Iron, Iron Sulfate, Manganese, Copper, Boron, Molybdenum, and Nickel, in a composted form.

2. The soil amendment of claim 1, wherein the mineral complex is blended at a rate of about 2, 4, 6, 8, or 12 tons per 24 ton portion of said soil amendment.

3. The soil amendment of claim 1, wherein the mineral complex and organic waste are blended in a 1:2 mix.

4. The soil amendment of claim 1, wherein the mineral complex and organic waste are blended in a 1:3 mix.

5. The soil amendment of claim 1, wherein the organic waste comprises manure.

6. The soil amendment of claim 5, wherein the amount of available nitrogen in said soil amendment is greater than 10 lbs/cubic yard.

7. The soil amendment of claim 5, wherein the amount of available nitrogen in said soil amendment is greater than 20 lbs/cubic yard.

8. The soil amendment of claim 7, wherein the manure and green waste, municipal solid waste or sewage are blended in a 1:1 mix.

9. The soil amendment of claim 1, further comprising *Thiobacillus*.

10. The soil amendment of claim 1, wherein the soil amendment has a pH of about 5.8 to about 7.0.

11. A method of making the soil amendment of claim 1 comprising:
    providing organic waste and a mineral complex that comprises about 3-35% elemental Sulfur, about 5%-90% Thiosulfate, about 8%-70% Sulfate, about 5%-35% Calcium Sulfate, about 3%-10% soluble Calcium, about 8%-15% Potassium as Potassium Sulfate, Aluminum Potassium Sulfate, and Potassium Silicate, Zinc, Iron, Iron Sulfate, Manganese, Copper, Boron, Molybdenum, and Nickel;
    mixing said organic waste with said mineral complex; and
    composting said mixture of organic waste and mineral complex for a period of time comprising at least 10 days.

12. The method of claim 11, wherein said period comprises at least 14 days.

13. The method of claim 11, wherein said period comprises at least 30 days.

14. The method of claim 11, wherein said period comprises at least 60 days.

15. The method of claim 11, wherein the mixture of organic waste and mineral complex has a pH of about 7, 6, 5, 4, or 3.

16. The method of claim 11, wherein the mineral complex is mixed at a rate of about 2, 4, 6, 8, or 12 tons per 24 ton portion of said soil amendment.

17. The method of claim 11, wherein the organic waste comprises manure.

18. The method of claim 17, wherein said manure comprises cow manure, pig manure, chicken manure, turkey manure, rabbit manure, duck manure, sheep manure, horse manure, goat manure, or human manure.

19. The method of claim 17, wherein said organic waste and said mineral complex are mixed with green waste, municipal solid waste, or sewage prior to said composting step.

20. The method of claim 17, wherein the organic waste and green waste, municipal solid waste, or sewage are blended in a 1:1 mix.

21. The method of claim 11, wherein the mineral complex comprises about 8% Sulfate, about 7% Sulfur Trioxide, about 16% elemental Sulfur, about 9% Potash, about 2% Bisulfites, and about 3.4% Thiosulfites.

22. The method of claim 11, further comprising measuring the pH of said soil amendment.

23. A method of using the soil amendment of claim 1 to improve plant growth or crop yield comprising:
    providing the soil amendment of claim 1,
    contacting the soil proximal to a plant or its roots or a with said soil amendment; and
    measuring the increase in plant growth or crop yield.

* * * * *